(12) United States Patent
Murakami

(10) Patent No.: US 10,272,931 B2
(45) Date of Patent: Apr. 30, 2019

(54) TRAVEL OBSTRUCTING DEVICE

(71) Applicant: Daifuku Co., Ltd., Osaka (JP)

(72) Inventor: Ryuya Murakami, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 40 days.

(21) Appl. No.: 15/794,067

(22) Filed: Oct. 26, 2017

(65) Prior Publication Data

US 2018/0118239 A1    May 3, 2018

(30) Foreign Application Priority Data

Oct. 31, 2016    (JP) .................................. 2016-213245

(51) Int. Cl.
| | |
|---|---|
| *B61L 5/18* | (2006.01) |
| *B61L 5/20* | (2006.01) |
| *B65G 35/06* | (2006.01) |
| *B65G 43/02* | (2006.01) |

(52) U.S. Cl.
CPC ............. *B61L 5/189* (2013.01); *B61L 5/206* (2013.01); *B65G 35/06* (2013.01); *B65G 43/02* (2013.01); *B65G 2201/02* (2013.01); *B65G 2203/0266* (2013.01); *B65G 2203/044* (2013.01); *B65G 2207/40* (2013.01)

(58) Field of Classification Search
CPC ......... B61L 5/189; B61L 5/206; B65G 35/06; B65G 43/02
See application file for complete search history.

(56) References Cited

U.S. PATENT DOCUMENTS

| | | | | |
|---|---|---|---|---|
| 5,008,967 A | * | 4/1991 | Barrios | .................... E01F 9/696 14/7 |
| 9,758,308 B1 | * | 9/2017 | Nishikawa | ........ H01L 21/67276 |
| 10,083,847 B2 | * | 9/2018 | Tomida | .................. B66C 15/045 |
| 2004/0118980 A1 | * | 6/2004 | Chang | ..................... G01S 17/88 246/1 C |
| 2006/0177291 A1 | * | 8/2006 | Kienzl | ..................... D06F 93/00 414/331.15 |
| 2017/0197794 A1 | * | 7/2017 | Murao | .............. H01L 21/67727 |
| 2018/0118239 A1 | * | 5/2018 | Murakami | .............. B61L 5/189 |

FOREIGN PATENT DOCUMENTS

| | | |
|---|---|---|
| JP | 200219605 A | 1/2002 |
| JP | 2015209185 A | 11/2015 |

\* cited by examiner

*Primary Examiner* — Jason C Smith

(74) *Attorney, Agent, or Firm* — The Webb Law Firm

(57) ABSTRACT

A travel obstructing device comprises a supported portion configured to be placed on a railed track, a main body portion which is suspended from, and supported by, the supported portion, a power-receiving portion configured to receive electric power from a non-contact-type electricity supplying portion, and a warning device configured to receive electric power supplied from the power-receiving portion and to issue a warning.

4 Claims, 3 Drawing Sheets

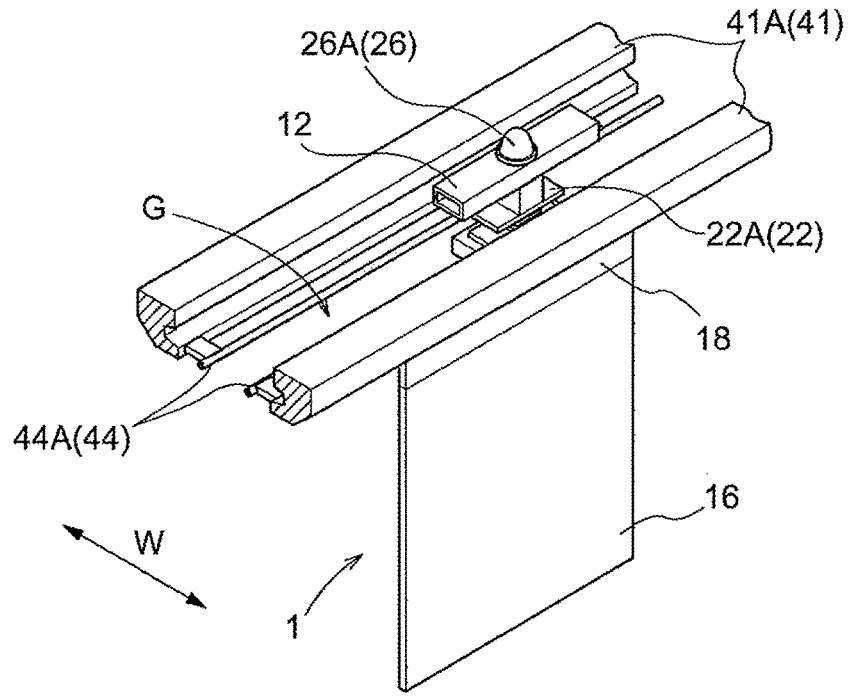
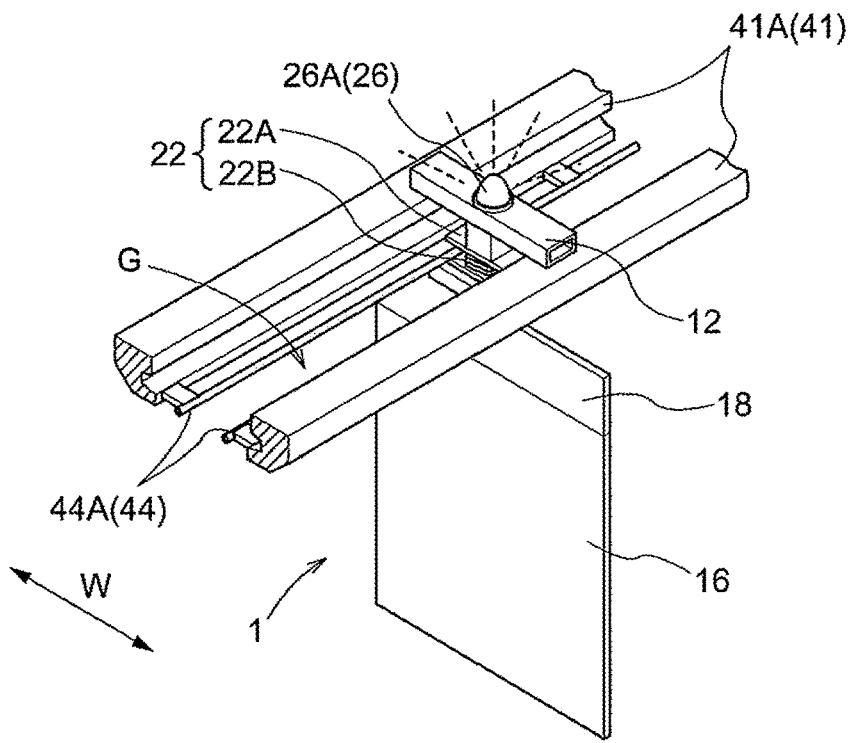

TRAVEL OBSTRUCTING DEVICE

CROSS-REFERENCE TO RELATED APPLICATION

This application claims priority to Japanese Patent Application No. 2016-213245 filed Oct. 31, 2016, the disclosure of which is hereby incorporated in its entirety by reference.

FIELD OF THE INVENTION

The present invention relates to a travel obstructing device for use in an article transport facility.

BACKGROUND

In an article transport facility provided with ceiling or overhead transport vehicles that travel along a railed track, a travel obstructing device for obstructing travel of a ceiling transport vehicle in order to ensure a worker's safety when performing maintenance work, for example, is used by placing the travel obstructing device on the railed track at a location upstream of the location (work location) at which work is performed. Generally, a ceiling transport vehicle travels while obtaining information on a distance to any obstacle located ahead by means of a sensor installed to its main body and is configured to stop automatically when the distance is less than or equal to a reference distance specified in advance. A travel obstructing device functions as an obstacle to a ceiling transport vehicle when it is placed on the railed track, to cause a ceiling transport vehicle approaching the work location to stop.

Examples of such travel obstructing devices are disclosed in JP Publication of Application No. 2002-19605 (Patent Document 1) and JP Publication of Application No. 2015-209185 (Patent Document 2). The travel obstructing devices disclosed in the references identified above are designed only from a viewpoint of ensuring a worker's safety. And additional arrangements are made to allow a worker to install such device by himself or herself, and to increase its strength.

However, for example, while a worker is working (e.g., performing maintenance work) with a travel obstructing device placed on the railed track, another worker may start working at a location further downstream. And in such a situation, the second worker who started working at the downstream location after the first worker may proceed with the work without placing a travel obstructing device for himself/herself, believing that the obstructing device already placed by the first worker upstream would be sufficient. In such a situation, if the first worker who finished work at the upstream location removes the travel obstructing device without notifying the second worker working downstream, any ceiling transport vehicle that was caused to be at rest until then would start to move, and may reach the work location located downstream at a predetermined speed. Of course, this would not happen if the second worker at the downstream location who started working after the first worker took a precautionary measure of placing a travel obstructing device for himself or herself. It would be preferable, from a viewpoint of improving safety of the entire facility, to have a mechanism in place that would makes it easier for a worker to become aware of the possibility that there can be an approaching ceiling transport vehicle even if such a precautionary measure is not taken. In that respect, improving safety in a situation where a number of workers work simultaneously was not considered in either Patent Document 1 or Patent Document 2.

SUMMARY OF THE INVENTION

Improvement of safety is desired in a situation where a number of workers work simultaneously in an article transport facility provided with a ceiling transport vehicle which travels along a railed track.

A travel obstructing device in accordance with the present invention and for use in an article transport facility that includes a railed track provided with a non-contact-type electricity supplying portion, and a ceiling transport vehicle configured to receive electric power from the non-contact-type electricity supplying portion and to travel along the railed track, the travel obstructing device being configured to be removably placed on the railed track and to obstruct travel of the ceiling transport vehicle when the travel obstructing device is placed on the railed track, the travel obstructing device comprises:

a supported portion configured to be placed on the railed track;

a main body portion which is suspended from, and supported by, the supported portion and which is configured to obstruct travel of the ceiling transport vehicle;

a power-receiving portion configured to be located across from the non-contact-type electricity supplying portion and to receive electric power from the non-contact-type electricity supplying portion; and a warning device configured to receive electric power supplied from the power-receiving portion and to issue a warning.

With the arrangement described above, travel of an approaching ceiling transport vehicle can be obstructed by the main body portion by suspending the main body portion from the railed track by placing the supported portion on the railed track, thus allowing a worker to ensure his or her own safety. In addition, because the travel obstructing device includes a power-receiving portion, the travel obstructing device can receive electric power from the non-contact-type electricity supplying portion by making use of the non-contact-type electricity supplying portion provided to the railed track to supply electric power for travel of a ceiling transport vehicle. And the electric power received by the power-receiving portion is supplied to the warning device additionally provided to the travel obstructing device to allow the warning device to issue a warning. The warning issued by the warning device can be easily recognized by another worker who is working, for example, at a location downstream along the transporting path; thus, the worker can be made aware of the fact that work is in progress. On the other hand, the another worker can be made aware that work has been completed, by the fact that the warning device is no longer issuing the warning. Thus, the worker working at the downstream location without placing a travel obstructing device for himself or herself can be warned of the possibility that there may be a ceiling transport vehicle from that point on. Thus, safety can be improved in a situation where a number of workers work simultaneously.

Additional features and advantages of the technology disclosed herein will be further clarified by the following description of exemplary and non-limiting embodiments described with reference to the attached drawings.

BRIEF DESCRIPTION OF THE DRAWINGS

FIG. 3 shows one phase of placing the travel obstructing device on the railed track, and FIG. 4 shows the travel obstructing device after it has been placed on the railed track.

DETAILED DESCRIPTION

Embodiments of a travel obstructing device are described with reference to the attached drawings. The travel obstructing device 1 in accordance with the present embodiment is used in an article transport facility 4 provided with a railed track 41 and ceiling transport vehicles (i.e., overhead transport vehicles) 45 that travel along the railed track 41, in order to ensure workers' safety, for example, when performing maintenance work.

Figure 1:
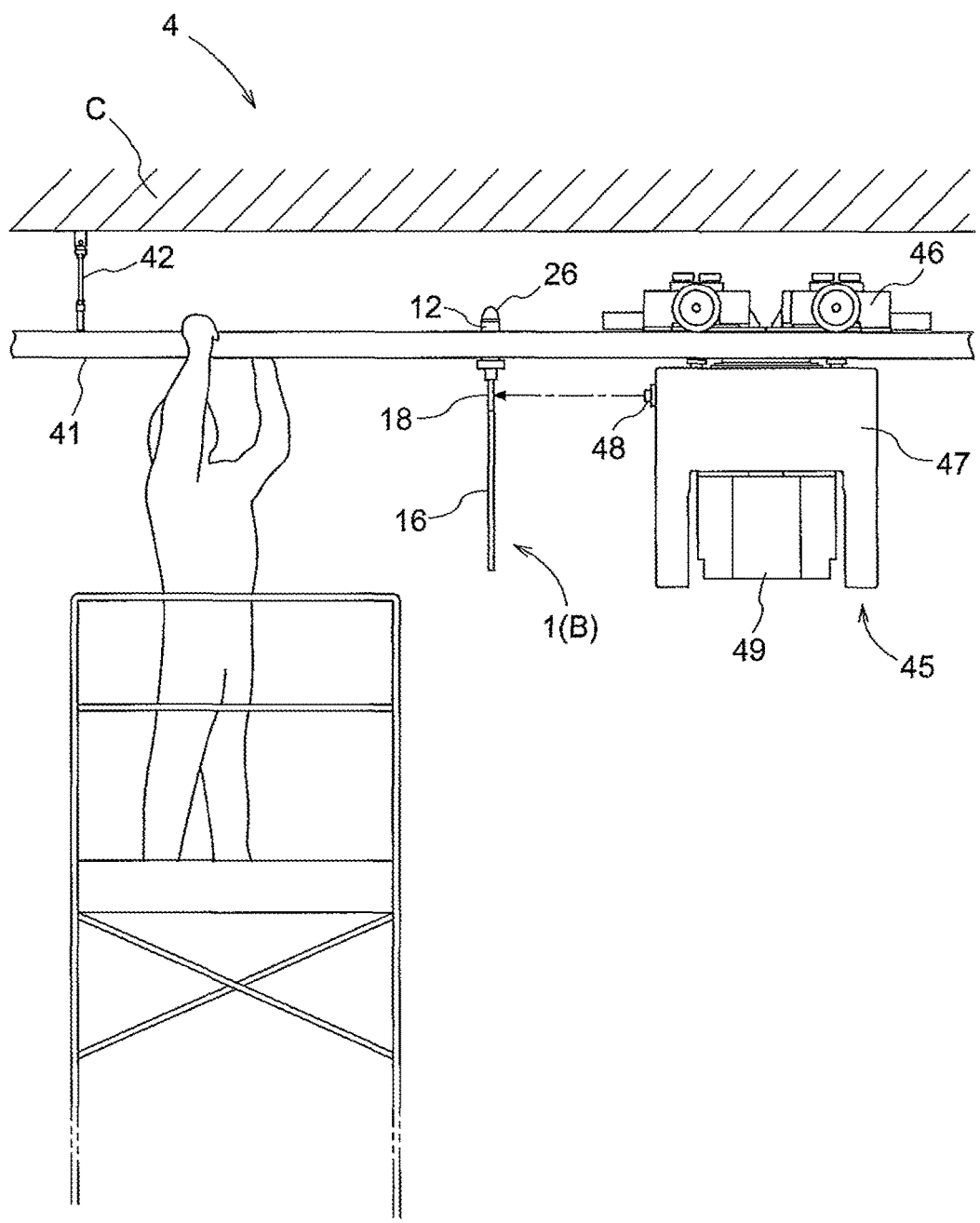
FIG. 1 is a diagram showing how a travel obstructing device in accordance with an embodiment may be used.
Figure 2:
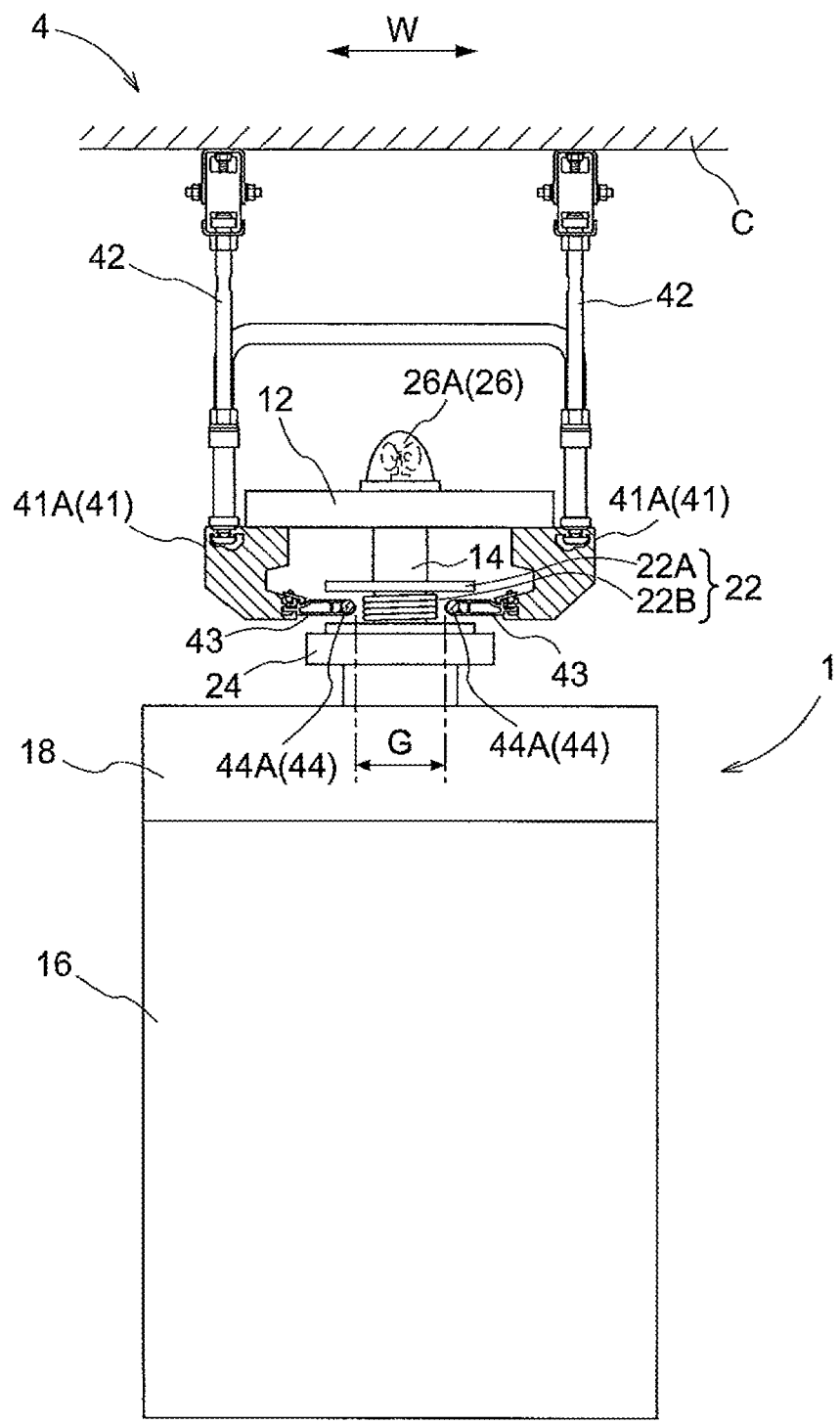
FIG. 2 is a front view of the travel obstructing device when it is placed on a railed track.

A railed track 41 is installed along each article transporting path in the article transport facility 4. As shown in FIGS. 1 and 2, the railed track 41 is installed near a ceiling C of a building in which the article transport facility 4 is installed. The railed track 41 includes a pair of rail members 41A located to be spaced apart from each other along a lateral width direction W. The railed track 41 is (e.g., the rail members 41A are) suspended and supported by means of suspending members 42 which are in turn suspended from the ceiling C.

The railed track 41 is provided with a non-contact-type electricity supplying portion 44. The non-contact-type electricity supplying portion 44 of the present embodiment includes a pair of electricity supply lines 44A connected to an electric power supply (not shown). And each of the pair of electricity supply lines 44A which are a part of the non-contact-type electricity supplying portion 44 is fixed to, and supported by, a free end of a support member 43 fixed to a corresponding one of the pair of rail members 41A. The support members 43 project inward along the lateral width direction W from respective rail members 41A such that the support members 43 are located across from each other. And each electricity supply line 44A is provided at an inward distal end (along the lateral width direction W) of the corresponding support member 43.

As shown in FIG. 1, a ceiling transport vehicle 45 includes a travel portion 46 which travels on and above the railed track 41, a vehicle main body 47 suspended from, and supported by, the travel portion 46, and a transfer portion 49 which is suspended from, and supported by, the vehicle main body 47 and transfers an article. In addition, the ceiling transport vehicle 45 includes a power-receiving portion (not shown) which is located across from, and to face, the non-contact-type electricity supplying portion 44 to receive electric power from the non-contact-type electricity supplying portion 44. The ceiling transport vehicle 45 is configured to receive electric power from the non-contact-type electricity supplying portion 44, and to travel by powering an electric motor (not shown) provided in the travel portion 46 using the received electric power. In addition, the ceiling transport vehicle 45 transfers an article by using the received electric power to cause the transfer portion 49 to be raised and lowered, to be slid or smoothly moved along the lateral width direction W, to be rotated about a vertical axis, and to cause gripping claws (not shown) provided to the transfer portion 49 to be opened and closed.

The sensor 48 is provided in the front face (i.e., a forward side surface with respect to the traveling direction) of the vehicle main body 47. For example, an optical sensor of a reflection type which has a light emitter and a light receiver may be used as the sensor 48. The ceiling transport vehicle 45 can detect any obstacle B located ahead in the traveling direction as a result of the fact that light emitted from the sensor 48 and reflected by any obstacle B that exists ahead in the traveling direction is received by the light receiver. And the ceiling transport vehicle 45 is configured to stop automatically if an obstacle B is detected by the sensor 48 within a reference distance set in advance and forward in the traveling direction. An example of an obstacle B is another ceiling transport vehicle 45 traveling along the railed track 41. With the arrangement above, collision between any two ceiling transport vehicles 45 can be avoided.

In an article transport facility 4, unscheduled maintenance work may have to be done, for example, when a small abnormal condition occurs in the railed track 41, etc. In such a case, a travel obstructing device 1 is used to ensure safety of the worker who performs the maintenance work. This travel obstructing device 1 is configured to be removably placed on, or supported by, the railed track 41. And the travel obstructing device 1 obstructs travel or passage of a ceiling transport vehicle 45 when the travel obstructing device 1 is placed on the railed track 41. That is, with the travel obstructing device 1 placed on the railed track 41, the travel obstructing device 1 functions as an obstacle B to a ceiling transport vehicle 45 to cause the ceiling transport vehicle 45 to stop temporarily. This allows a worker to ensure his or her safety.

As shown in FIG. 2, a travel obstructing device 1 of the present embodiment includes a supported portion 12 and a main body portion 16 that performs the basic function of the travel obstructing device 1 and further includes a power-receiving portion 22 and a warning device 26 that performs the additional function (function to draw attention described below).

The supported portion 12 is so configured that the supported portion 12 can be placed on the railed track 41. In the present embodiment, the supported portion 12 consists of a rectangular pipe of a prescribed length. The length of the supported portion 12 (length along its longitudinal direction) is set to be greater than the distance along the lateral width direction W between the pair of rail members 41A forming the railed track 41. This allows the supported portion 12 to be placed on the pair of rail members 41A (i.e., with one portion of the supported portion 12 resting on one rail member 41A and another portion of the supported portion 12 resting on the other rail member 41A) when the supported portion 12 is in a posture in which the supported portion 12 extend along a direction (lateral width direction W) perpendicular to the direction of the railed track 41 (i.e., in a posture in which the longitudinal direction of the supported portion 12 is parallel to the lateral width direction W) as shown in FIG. 4.

On the other hand, the width (dimension along a direction (along a short side) perpendicular to the longitudinal direction in plan view) of the supported portion 12 is set to be less than the distance (along the lateral width direction W) between the pair of electricity supply lines 44A provided to the railed track 41. This allows the supported portion 12 to be able to be passed through the space or the gap G between the pair of rail members 41A (more specifically, the space or the gap between the pair of electricity supply lines 44A) when the supported portion 12 is in a posture in which the supported portion 12 extends parallel to the railed track 41 (i.e., in a posture in which the longitudinal direction of the supported portion 12 is parallel to the railed track 41) as shown in FIG. 3.

As such, the supported portion 12 can be passed through the space or gap G between the pair of rail members 41A when the supported portion 12 is in a first posture in which the supported portion 12 extends parallel to the railed track 41 (see FIG. 3) whereas the supported portion 12 is in a state to be placed on the pair of rail members 41A (i.e., with one portion of the supported portion 12 resting on one rail member 41A and another portion of the supported portion 12 resting on the other rail member 41A) when the supported portion 12 is in the second posture in which the supported portion 12 extends perpendicular to the railed track 41 (see FIG. 4).

The main body portion 16 is suspended from, and supported by, the supported portion 12 through a connecting shaft 14, etc. The main body portion 16 may be a generally flat panel or board (i.e., a member which is flat and thin (thickness is less than other dimensions)), for example. The main body portion 16 is preferably relatively light in weight so that a worker would be able to better handle the travel obstructing device when he or she needs to lift or raise it to place it on the railed track 41 by himself or herself. The main body portion 16 may be made of a lighter weight material such as a resin (preferably a foam plastic) etc., for example. The main body portion 16 extends parallel to a direction (lateral width direction W) that is perpendicular to the railed track 41 when the supported portion 12 is in the second posture.

As shown in FIG. 1, a reflecting plate 18 is provided to the main body portion 16 at a height position that corresponds to the height of the sensor 48 of the ceiling transport vehicle 45. The reflecting plate 18 may be a rectangular thin metallic plate, for example, and is attached to the surface of the main body portion 16. The reflecting plate 18 is attached to at least a primary surface of the generally flat-plate shaped main body portion 16. In the present embodiment, a reflecting plate 18 is attached to the surface on each side of the main body portion 16. The reflecting plate 18 functions to reflect the light emitted from the sensor 48 of the ceiling transport vehicle 45 to direct the light back toward the sensor 48. The main body portion 16 is suspended from, and supported by, the supported portion 12 to function as a substantive obstacle B to a ceiling transport vehicle 45 to obstruct travel or passage of the ceiling transport vehicle 45.

As shown in FIG. 2, the travel obstructing device 1 of the present embodiment includes a power-receiving portion 22, a power converter 24, and a warning device 26. The power-receiving portion 22 and the power converter 24 are located between the supported portion 12 (and the connecting shaft 14) and the main body portion 16 along a vertical direction. The power-receiving portion 22 has an iron core 22A which is located across from the electricity supply lines 44A which form a part of the non-contact-type electricity supplying portion 44, and a coil 22B wound around the iron core 22A. The iron core 22A is generally formed in a shape of an "H" turned on its side, or of a flattened or squashed "I". The iron core 22A is fixed to the connecting shaft 14 such that its longitudinal direction is parallel to the longitudinal direction of the supported portion 12. Two flat plate portions (i.e., upper and lower flat plate portions) that are part of the iron core 22A are located across from the electricity supply lines 44A above and below the electricity supply lines 44A. That is, one of the two flat plate portions of the iron core 22A is located above the electricity supply lines 44A and the other is located below the electricity supply lines 44A.

The iron core 22A has a shaft or core portion which connects the two upper and lower flat plate portions along the vertical direction, and the coil 22B is wound around this shaft. When the travel obstructing device 1 is placed on the railed track 41 (with the supported portion 12 in the second posture as shown in FIGS. 2 and 4), the coil 22B is located at the same vertical position or height as the electricity supply lines 44A. In addition, the coil 22B is located in the gap G between the pair of electricity supply lines 44A along the lateral width directions W. When the magnetic field generated by the alternating current that flows through the electricity supply lines 44A couples with the iron core 22A, magnetic field penetrates through the iron core 22A. This induces electromotive force in the coil 22B allowing the power-receiving portion 22 to receive electric power from the non-contact-type electricity supplying portion 44, without contact. Thus, the power-receiving portion 22 is located across from the non-contact-type electricity supplying portion 44 (or more specifically, the electricity supply lines 44A) to receive electric power from the non-contact-type electricity supplying portion 44.

In addition, the width (dimension of the shorter side in plan view) of the power-receiving portion 22 is set to be less than the spacing or the gap G between the pair of electricity supply lines 44A along the lateral width direction W. Therefore, the upper flat plate portion of the iron core 22A which forms a part of the power-receiving portion 22 can pass through the gap G between the pair of electricity supply lines 44A (see FIG. 3) when the supported portion 12 is in the first posture (posture parallel to the railed track 41).

The power converter 24 includes a switching component, a diode, a smoothing capacitor, among other components. The power converter 24 converts the alternating current power received by the power-receiving portion 22 into direct-current power (for example, electric power of a constant voltage of a desired value, such as 12 V or 24 V, etc.).

The warning device 26 operates with the electric power supplied from the power-receiving portion 22. That is, the warning device 26 operates with the direct-current power as a source of electric power of a constant voltage resulting from the alternating current power received by the power-receiving portion 22 being converted to direct current power by the power converter 24. The warning device 26 is fixed to the top surface of the supported portion 12. The warning device 26 issues a warning when it receives electric power supplied from the power-receiving portion 22. In the present embodiment, a revolving warning light 26A is provided as the warning device 26. And the revolving warning light 26A issues a warning by rotating while emitting light. The light emitted by the revolving warning light 26A is preferably visible light and is preferably of a color that promotes caution, such as red or yellow, etc. This allows another worker who is near the work location to easily recognize the light from the revolving warning light 26A. And this arrangement allows another worker who is near the work location to be become aware of the fact that work is in progress at that location.

Note that, in order to place the travel obstructing device 1 on the railed track 41, the travel obstructing device 1 is raised in a posture parallel to the railed track 41 (i.e., with the supported portion 12 in the first posture) to allow the supported portion 12 be passed through the gap G between the pair of electricity supply lines 44A (see FIG. 3). In doing so, the travel obstructing device 1 is raised until the upper flat plate portion of the iron core 22A which is a part of the power-receiving portion 22 is above the electricity supply lines 44A while the lower flat plate portion is still below the electricity supply lines 44A. Subsequently, the entire travel obstructing device 1 is rotated through 90 degrees about the shaft extending along the vertical direction to place the travel obstructing device 1 in a posture perpendicular to the railed track 41 (i.e., with the supported portion 12 in the second posture) as shown in FIG. 4. Note that, if a reflecting plate 18 is attached to each side of the main body portion 16 as in the present embodiment, the travel obstructing device 1 can be rotated in either direction.

Then, with the posture of the supported portion 12 changed from the first posture to the second posture, above or at a higher height than the railed track 41, the supported portion 12 is placed on the pair of rail members 41A (i.e., with a portion of the supported portion 12 resting on one rail member 41A of the pair while another portion of the supported portion 12 resting on the other rail member 41A), resulting in the travel obstructing device 1 being placed on the railed track 41. At the same time, the two upper and lower flat plate portions of the iron core 22A which is a part of the power-receiving portion 22 come to be located across from the electricity supply line 44A from above and below so that the power-receiving portion 22 becomes ready to receive electric power. When the power-receiving portion 22 starts to receive electric power, the revolving warning light 26A which functions as a warning device 26 starts to emit light while revolving. Emitting of light by the revolving warning light 26A while revolving allows another worker who is near the work location to become aware of the fact that work is in progress at that location as described above.

After completing the work at that location, the worker can remove the travel obstructing device 1 from the railed track 41 by performing the steps described above in reverse order. When the travel obstructing device 1 is removed, the revolving warning light 26A which functions as a warning device 26 loses the source of electric power, and stops operating. And the fact that revolving warning light 26A stopped emitting light and revolving allows another worker who is near the work location to become aware of the fact that the work has been completed. By visually demanding attention of another worker, the worker can be made aware of the fact that the work at the location has been completed.

For example, while a worker is performing work with a travel obstructing device placed on the railed track 41, another worker may start working at a location further downstream. And in such a situation, the second worker (who started working at the downstream location after the first worker) may proceed with the work without placing a travel obstructing device for himself/herself, believing that the obstructing device already placed by the first worker upstream would be sufficient. Even in such a situation, if the first worker who completed the work at the upstream location removes the travel obstructing device, the worker working at the downstream location can be made aware of the fact that the work at the upstream location has been completed because this removal stops the warning issued (i.e., light emitted) up to that point in time, by the warning device 26 of the travel obstructing device 1. And thus the worker working at the downstream location without placing a travel obstructing device 1 for himself or herself can be warned of the possibility that there may be a ceiling transport vehicle 45 from that point on. Therefore, by using the travel obstructing device 1 of the present embodiment, safety can be improved in a situation where a number of workers work simultaneously.

Further, with the travel obstructing device 1 in accordance with the present embodiment, the warning device 26 is turned on as the travel obstructing device 1 is placed on the railed track 41, and is turned off as the travel obstructing device 1 is removed from the railed track 41. Thus, the operational state of the warning device 26 can be changed properly simply by taking normal steps to place the travel obstructing device 1 on, and remove it from, the railed track 41, without having to take additional actions such as turning a switch on or off. Therefore, without imposing additional burden on a worker, it is possible to properly draw attention of another worker to improve safety.

Other Embodiments (1) In the embodiment described above, an example is described in which the warning device 26 is the revolving warning light 26A. However, the invention is not limited to such an arrangement. The warning device 26 may be, for example, a warning light which only emits light (which simply turns on, or flashes) without revolving. In addition, the warning device 26 may, for example, be a buzzer which emits sound as a warning. With such an arrangement, by audibly demanding attention of another worker, the worker can be made aware of the fact that the work at the location has been completed. It would be preferable for the buzzer that functions as the warning device 26 to periodically emit warning sound at predetermined intervals such as once every 10 seconds or 30 seconds, for example, to reduce any annoyance of having to hear a constant warning sound. In addition, the warning device 26 that emits sound may include a loudspeaker, etc. Further, the warning device 26 may be a combination of a warning light, a buzzer, and a loudspeaker to emit both light and sound as a warning.

(2) In the embodiment described above, an example is described in which the operational state of the warning device can be changed by placing the travel obstructing device on, and removing it from, the railed track. However, the invention is not limited to such an arrangement. For example, a switch (on/off switch) for changing the operational state of the warning device 26 may be additionally provided to the travel obstructing device 1.

(3) In the embodiment described above, an example is described in which one reflecting plate 18 is attached on each side of the main body portion 16. However, the invention is not limited to such an arrangement. The reflecting plate 18 may be attached to only one principal surface of the main body portion 16. In this case, when placing the travel obstructing device 1 on the railed track 41, the entire travel obstructing device 1 needs to be rotated through 90 degrees to an orientation such that the reflecting plate 18 faces the upstream direction of the transporting path.

(4) In the embodiment described above, an example is described in which an optical sensor of a reflection type is provided to the vehicle main body 47 of the ceiling transport vehicle 45 as the sensor 48. However, the invention is not limited to such an arrangement. For example, a contact sensor may be provided as the sensor 48 in place of an optical sensor. In this case, the ceiling transport vehicle 45 is configured to detect the presence of an obstacle B based on detection information from the contact sensor. And the travel obstructing device 1 causes the ceiling transport vehicle 45 to stop temporarily (i.e., obstructs the travel or passage of the ceiling transport vehicle 45) through physical contact. Alternatively, both an optical sensor and a contact sensor may be provided to the ceiling transport vehicle 45 as the sensor 48.

(5) In the embodiment described above, an example is described in which the travel obstructing device 1 is placed on the railed track 41 by passing it through the gap G between the pair of rail members 41A. However, the invention is not limited to such an arrangement. For example, the travel obstructing device 1 may be placed on the railed track 41 by moving it from a side (from one side along the lateral width direction W).

(6) Any arrangement and feature disclosed in any one embodiment described above (including the main embodiment and any alternative embodiment described above, which is true of any embodiment mentioned below) may be used in combination with any arrangement and feature disclosed in another embodiment, unless such combination gives rise to a contradiction. Regarding any arrangement, the embodiments disclosed in the present specification are presented for the sole purpose of illustrating examples with respect to all aspects of the embodiments. And it is possible to make suitable changes and modifications without departing from the spirit of the present disclosure.

Summary of Embodiments

To summarize, a travel obstructing device in accordance with the present disclosure is arranged as follows.

A travel obstructing device for use in an article transport facility that includes a railed track provided with a non-contact-type electricity supplying portion, and a ceiling transport vehicle configured to receive electric power from the non-contact-type electricity supplying portion and to travel along the railed track, the travel obstructing device being configured to be removably placed on the railed track and to obstruct travel of the ceiling transport vehicle when the travel obstructing device is placed on the railed track, the travel obstructing device comprises:

a supported portion configured to be placed on the railed track;

a main body portion which is suspended from, and supported by, the supported portion and which is configured to obstruct travel of the ceiling transport vehicle;

a power-receiving portion configured to be located across from the non-contact-type electricity supplying portion and to receive electric power from the non-contact-type electricity supplying portion; and a warning device configured to receive electric power supplied from the power-receiving portion and to issue a warning.

With the arrangement described above, travel of an approaching ceiling transport vehicle can be obstructed by the main body portion by suspending the main body portion from the railed track by placing the supported portion on the railed track, thus allowing a worker to ensure his or her own safety. In addition, because the travel obstructing device includes a power-receiving portion, the travel obstructing device can receive electric power from the non-contact-type electricity supplying portion by making use of the non-contact-type electricity supplying portion provided to the railed track to supply electric power for travel of a ceiling transport vehicle. And the electric power received by the power-receiving portion is supplied to the warning device additionally provided to the travel obstructing device to allow the warning device to issue a warning. The warning issued by the warning device can be easily recognized by another worker who is working, for example, at a location downstream along the transporting path; thus, the worker can be made aware of the fact that work is in progress. On the other hand, the another worker can be made aware that work has been completed, by the fact that the warning device is no longer issuing the warning. Thus, the worker working at the downstream location without placing a travel obstructing device for himself or herself can be warned of the possibility that there may be a ceiling transport vehicle from that point on. Thus, safety can be improved in a situation where a number of workers work simultaneously.

In one embodiment, the railed track preferably includes a pair of rail members spaced apart from each other along a lateral width direction, wherein the supported portion is preferably capable of being passed through a gap between the pair of rail members when the supported portion is in a first posture in which the supported portion extends parallel to the railed track, wherein the supported portion is preferably in a state to be placed on the pair of rail members when the supported portion is in a second posture in which the supported portion extends perpendicular to the railed track, and wherein it is preferable that the supported portion is placed on the pair of rail members and the power-receiving portion becomes ready to receive electric power with a posture of the supported portion changed from the first posture to the second posture, at a higher height than the railed track.

With the arrangement described above, the supported portion can be placed on the pair of rail members simply by raising the travel obstructing device with the supported portion in the first posture and by subsequently changing the posture to the second posture at a higher height than the railed track, allowing the travel obstructing device to be easily placed on the railed track. In addition, since the electric power starts to be supplied as the posture of the supported portion is changed to the second posture to place the travel obstructing device on the railed track, there is no need to take additional actions such as turning a switch on to cause the warning device to operate. In addition, since the electric power stops being supplied as the posture of the supported portion is changed to the first posture to remove the travel obstructing device from the railed track, there is no need to take additional actions such as turning a switch off to cause the warning device to stop operating. As such, the operational state of the warning device can be changed properly simply by taking normal steps to place the travel obstructing device on, and remove it from, the railed track, it is possible to properly draw attention of another worker without imposing additional burden on a worker.

In one embodiment, the warning device is preferably configured to emit at least one of light and sound as the warning.

With the arrangement described above, by visually or audibly demanding attention, another worker who is working near the work location can be reliably made aware of the fact that the work is in progress or has been completed.

In one embodiment, the ceiling transport vehicle is preferably configured to stop automatically when a sensor of a reflection type provided to a vehicle main body detects an obstacle located ahead in a traveling direction, and wherein a reflecting plate is preferably provided to the main body portion at a height that corresponds to a height of the sensor of the ceiling transport vehicle.

With the arrangement described above, by providing a reflecting plate to the main body portion to make use of the sensor installed to the vehicle main body of a ceiling transport vehicle, the approaching ceiling transport vehicle can be caused to stop automatically without any contact therewith, allowing a worker to ensure his or her own safety.

The travel obstructing device in accordance with the present disclosure only needs to perform at least one of the effects described above.

What is claimed is:

1. A travel obstructing device for use in an article transport facility that includes a railed track provided with a non-contact-type electricity supplying portion, and a ceiling transport vehicle configured to receive electric power from the non-contact-type electricity supplying portion and to travel along the railed track, the travel obstructing device being configured to be removably placed on the railed track and to obstruct travel of the ceiling transport vehicle when the travel obstructing device is placed on the railed track, the travel obstructing device comprising:

a supported portion configured to be placed on the railed track;

a main body portion which is suspended from, and supported by, the supported portion and which is configured to obstruct travel of the ceiling transport vehicle;

a power-receiving portion configured to be located across from the non-contact-type electricity supplying portion and to receive electric power from the non-contact-type electricity supplying portion; and a warning device configured to receive electric power supplied from the power-receiving portion and to issue a warning.

2. The travel obstructing device as defined in claim 1, wherein the railed track includes a pair of rail members spaced apart from each other along a lateral width direction, wherein the supported portion is capable of being passed through a gap between the pair of rail members when the supported portion is in a first posture in which the supported portion extends parallel to the railed track, wherein the supported portion is in a state to be placed on the pair of rail members when the supported portion is in a second posture in which the supported portion extends perpendicular to the railed track, and wherein the supported portion is placed on the pair of rail members and the power-receiving portion becomes ready to receive electric power with a posture of the supported portion changed from the first posture to the second posture, at a higher height than the railed track.

3. The travel obstructing device as defined in claim 1, wherein the warning device is configured to emit at least one of light and sound as the warning.

4. The travel obstructing device as defined in claim 1, wherein the ceiling transport vehicle is configured to stop automatically when a sensor of a reflection type provided to a vehicle main body detects an obstacle located ahead in a traveling direction, and wherein a reflecting plate is provided to the main body portion at a height that corresponds to a height of the sensor of the ceiling transport vehicle.

* * * * *